United States Patent Office 3,006,919
Patented Oct. 31, 1961

3,006,919
NOVEL HETEROCYCLIC SULFONES AND
PROCESS FOR MAKING THE SAME
Richard Joseph Gaul, Cleveland, Ohio, and Winfried Josef Fremuth, Stamford, Conn., assignors to American Cyanamid Company, New York, N.Y., a corporation of Maine
No Drawing. Filed Nov. 2, 1959, Ser. No. 850,057
8 Claims. (Cl. 260—306.7)

This invention relates to a new class of chemical compounds and to a process for preparing the same.

In accordance with the present invention it has been found that a new class of heterocyclic sulfones to which may be assigned the structure of 3-substituted-2-thiazolidinone 1,1-dioxides may be conveniently and readily prepared by a novel oxidation process of either 3-substituted-2-thiazolidinethiones or 3-substituted-2-thiazolidinones.

The 3-substituted-2-thiazolidinone, 1,1-dioxides prepared in accordance with the teachings of the present invention may be represented by the following structural formula:

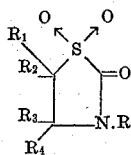

in which R is a member selected from the group consisting of alkyl, substituted alkyl, substituted aryl, aryl, aralkyl and cycloalkyl radicals and $R_1$, $R_2$, $R_3$, and $R_4$, are each selected from the group consisting of hydrogen, lower alkyl, substituted lower alkyl, aryl, substituted aryl, aralkyl and cycloalkyl radicals.

The prior art discloses that substituted 2-thiazolidinethiones may be converted to the corresponding 2-thiazolidinones by the reaction of the former with alkaline hydrogen peroxide or potassium permanganate or mercuric oxide in acetic acid. Generally, however, the presence of certain substituents in the reactant precludes the use of such reagents. Thus, for example, a nitrile substituent at the 3-position of the 2-thiazolidinethione would not survive reaction with alkaline hydrogen peroxide and would further be hydrolyzed to an amide in the mercuric oxide-acetic acid procedure.

It has now been discovered that a 3-substituted-2-thiazolidinethione may be rapidly and easily converted to the corresponding 3-substituted-2-thiazolidinone without adverse effect upon a substituent such as a nitrile grouping by the use of an oxidizing agent, e.g. hydrogen peroxide, in a mildly acidic medium, e.g. acetic acid. Surprisingly, however, the heterocyclic sulfur atom is converted at the same time to a sulfone by virtue of this oxidation.

The compounds of the present invention find wide use in various applications. Thus, for example, the novel heterocyclic sulfones of the present invention are useful as insecticides, herbicides, fungicides, intermediates for the preparation of other chemicals, and the like.

The procedure for the preparation of the novel heterocyclic sulfones generally comprises adding at least three and preferably five molar equivalents of a suitable oxidizing agent, e.g. hydrogen peroxide, to a hot solution of the 3-substituted-2-thiazolidinethione in an acid such as acetic acid. A strongly exothermic reaction ensues and within a very short period of time the solution develops an opalescence of milk of sulfur which rapidly coagulates to a plastic mass leaving a clear, colorless solution. After the initial reaction subsides, gentle heating generally starts a much milder reaction which is completed by maintaining the solution at a temperature of from about 50° C. to about 90° C. for approximately two hours. The sulfur, amounting to one gram-atom per mole of product, is removed and crystalline products are obtained by chilling the final solutions. The products are usually neutral, fairly high melting solids which are sparingly soluble in cold acetic acid, water and the common organic solvents.

While the use of an oxidizing agent such as hydrogen peroxide in an acid such as acetic acid is generally preferred for the preparation of the novel cyclic sulfones of the present invention, it is possible to employ suitable other oxidizing agents in various acidic media, such as hydrogen peroxide in formic acid, hydrogen peroxide in propionic acid, hydrogen peroxide in tertiary butanol, monoperphthalic acid in ether, monoperphthalic acid in dioxane, monoperphthalic acid in tetrahydrofuran, monoperphthalic acid in chloroform, perbenzoic acid in ether, perbenzoic acid in dioxane, perbenzoic acid in tetrahydrofuran, perbenzoic acid in chloroform, potassium permanganate in water and potassium dichromate or chromic acid in water or aqueous acetone and the like.

While temperatures over a wide range, e.g. 20° C. to 100° C., may be employed, it is preferred to carry out the oxidation reaction at temperatures from about 50° C. to about 90° C.

The following examples serve to illustrate the present invention, but they are not intended to limit it thereto. The parts are by weight unless otherwise indicated.

EXAMPLE 1

3-(2-cyanoethyl)-2-thiazolidinone 1,1-dioxide

To a solution of 62.6 parts of 3-(2-cyanoethyl)-thiazolidine-2-thione and 300 parts of glacial acetic acid preheated to 70° C. are added 157 parts of 30% hydrogen peroxide over a period of 25 minutes. The temperature of the strongly exothermic reaction is held at 70–80° C. throughout the addition with ice bath cooling. After the exotherm subsides the mixture is held at 70–80° C. for additional one and half hours. The solution is filtered to remove precipitated sulfur, then filtered with suction while hot through diatomaceous silica filter aid.

The solution is cooled and the product is then removed from the solution by suction filtration giving a total yield of 53.6 parts of crystalline material, (78.3%), M.P. 143.8–145° C. An analytical sample, after recrystallization from acetic acid, melts at 145.7–6.3° C.

Analysis.—Calculated for $C_6H_8N_2SO_3$: C, 38.29; H, 4.28; N, 14.89; S, 17.04. Found: C, 38.43; H, 4.36; N, 14.13; S. 17.27.

EXAMPLE 2

3-(2-carboxyethyl)-2-thiazolidinone 1,1-dioxide

To a solution of 47.8 parts of 3-(2-carboxyethyl) thiazolidine-2-thione and 250 parts of glacial acetic acid warmed to 70° C. are added 107 parts of 30% hydrogen peroxide over a period of 15 minutes. Following the exothermic reaction which ensues after the addition, the reaction mixture is held at 70–80° C. with intermittent cooling. The resulting mixture is then maintained at a temperature of 70–80° C. for an additional two hours. After the vacuum filtration of the hot mixture to remove precipitated sulfur, the filtrate is stored and cooled for several hours. A total yield of 44.1 parts (85.3%) of product, M.P. 178.3–8.9° C. with gas evolution, is obtained. An analytical sample recrystallized from boiling acetic acid melts at 178.8–179.3° C. with gas evolution.

Analysis.—Calculated for $C_6H_9O_5NS$: C, 34.78; H, 4.38; N, 6.76; S, 15.47. Found: C, 35.07; H, 4.42; N, 7.02; S, 15.02.

EXAMPLE 3

3-(2-carbamoylethyl)-2-thiazolidinone 1,1-dioxide

Ten parts of 30% hydrogen peroxide are added at once to a warm (40° C.) solution of 5 parts of 2-oxo-3-thiazolidinepropionamide in 25 parts of glacial acetic acid. The solution is heated to 70° for two hours. Upon chilling of the solution no crystalline sulfone separates. The solution is then vacuum concentrated to about ten parts and is diluted with water. Upon chilling faintly tan crystals are obtained. Further concentration and chilling of the filtrate yields an additional amount of product. The two crops of crystals are combined, dissolved in about 25 parts of hot water, treated with decolorizing carbon, filtered and stored at 5° for several hours. Colorless platelets, 0.85 part (14.4%), M.P. 172.1–173.6 with decomposition are isolated.

*Analysis.*—Calculated for $C_6H_{10}N_2O_4S$: C, 34.94; H, 4.89; S, 15.55. Found: C, 34.74; H, 4.74; S, 15.43.

EXAMPLE 4

3-phenyl-2-thiazolidinone 1,1-dioxide

Seventeen parts (0.5 mol.) of 30% hydrogen peroxide are added dropwise to a hot (75°), stirred suspension of 19.5 parts (0.1 mol.) of 3-phenyl-2-thiazolidinethione in 150 parts of glacial acetic acid. The temperature is held at 70°–80° by means of external cooling and subsequently sulfur is precipitated and a clear orange solution results. Following the subsidence of the exotherm, the mixture is held at 70° for an additional two hours. During this period the solution changes in color from orange to red to a dark reddish-purple. After filtration the solution is chilled and the product which is crystalline is removed by suction filtration and is washed with two 25 part portions of water and dried to yield deep violet crystals, M.P. 171.7–172.4. An additional quantity of product is obtained from the other liquors for an overall yield of 10.59 parts (51.7%). Several recrystallizations from acetic acid, accompanied by treatment with decolorizing carbon, yields colorless, analytical material, M.P. 171.5–172.3°.

*Analysis.*—Calculated for $C_4H_9NO_3S$: C, 51.17; H, 4.29; N, 6.23; S, 15.18. Found: C, 51.27; H, 4.37; N, 6.54; S, 15.13.

EXAMPLE 5

3-benzyl-2-thiazolidinone 1,1-dioxide

The procedure of Example 4 is repeated employing 20.9 parts (0.1 mol.) of 3-benzyl-2-thiazolidinethione in 150 parts of glacial acetic acid. The final, colorless solution is freed from plastic sulfur and is then chilled. The product is removed, is washed with 25 parts of cold, glacial acetic acid and 50 parts of water and is dried to yield colorless crystals, M.P. 156.5–157.2°. An additional quantity of product, obtained from the mother liquor, raises the overall yield to 15.2 parts (67.6%). Analytical material M.P. 156.5–157.2, is obtained by recrystallization from acetic acid.

*Analysis.*—Calculated for $C_{10}H_{11}NO_3S$: C, 53.2; H, 4.92; N, 6.22; S, 14.23. Found: C, 53.06; H, 5.06; N, 6.25; S, 14.08.

In order to illustrate the utility of the novel heterocyclic sulfones of the present invention, herbicide and fungicide tests were conducted employing the compounds of Examples 4 and 5, 3-phenyl-2-thiazolidinone 1,1-dioxide and 3-benzyl-2-thiazolidinone 1,1-dioxide. A tabulation of the results obtained which shows the marked activity of these compounds as toxicants is as follows:

TABLE

| | Concentration, p.p.m. | Herbicidal activity | | Fungicidal activity | |
|---|---|---|---|---|---|
| | | Wheat seeds, percent kill | Radish seeds, percent kill | *Sclerotinia fructigena*, percent kill | *Macrosporium sarcinaeforme*, percent kill |
| 3-phenyl-2-thiazolidinone 1,1-dioxide. | 1,000 | 100 | 74 | Not tested. | Not tested. |
| | 100 | 84 | 4 | 100 | 0. |
| 3-benzyl-2-thiazolidinone 1,1-dioxide. | 1,000 | 100 | 80 | Not tested. | Not tested. |
| | 100 | 58 | 0 | 100 | 100. |

We claim:

1. A compound of the formula:

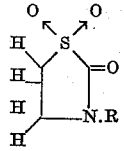

in which R is a member selected from the group consisting of 2-cyanoethyl, 2-carboxyethyl, 2-carbamoylethyl, benzyl and phenyl.

2. A compound as in claim 1 in which R is

—CH₂CH₂CN

3. A compound as in claim 1 in which R is

—CH₂CH₂COOH

4. A compound as in claim 1 in which R is

—CH₂CH₂CONH₂

5. A compound as in claim 1 in which R is benzyl.

6. A compound as in claim 1 in which R is phenyl.

7. A process for preparing a 3-substituted-2-thiazolidinone 1,1-dioxide in which the substituent is selected from the group consisting of 2-cyanoethyl, 2-carboxyethyl, 2-carbamoylethyl, benzyl and phenyl which comprises oxidizing the corresponding 3-substituted-thiazolidinethione with hydrogen peroxide in the presence of acetic acid.

8. A process for preparing a 3-substituted-2-thiazolidinone 1,1-dioxide in which the substituent is selected from the group consisting of 2-cyanoethyl, 2-carboxyethyl, 2-carbamoylethyl, benzyl and phenyl which comprises oxidizing the corresponding 3-substituted-2-thiazolidinone with hydrogen peroxide in the presence of acetic acid.

References Cited in the file of this patent

UNITED STATES PATENTS 2,624,729     Melamed et al.     Jan. 6, 1953

OTHER REFERENCES

Erlenmeyer et al.: Chem. Abstracts, vol. 41. p. 7397 (1947).

Troutman et al.: J. Am. Chem. Soc., vol. 70, pp. 3436–3439 (1949).